Nov. 6, 1928.    1,690,194
C. E. GIRTON
KNEE JOINT FOR ARTIFICIAL LIMBS
Filed Jan. 30, 1926
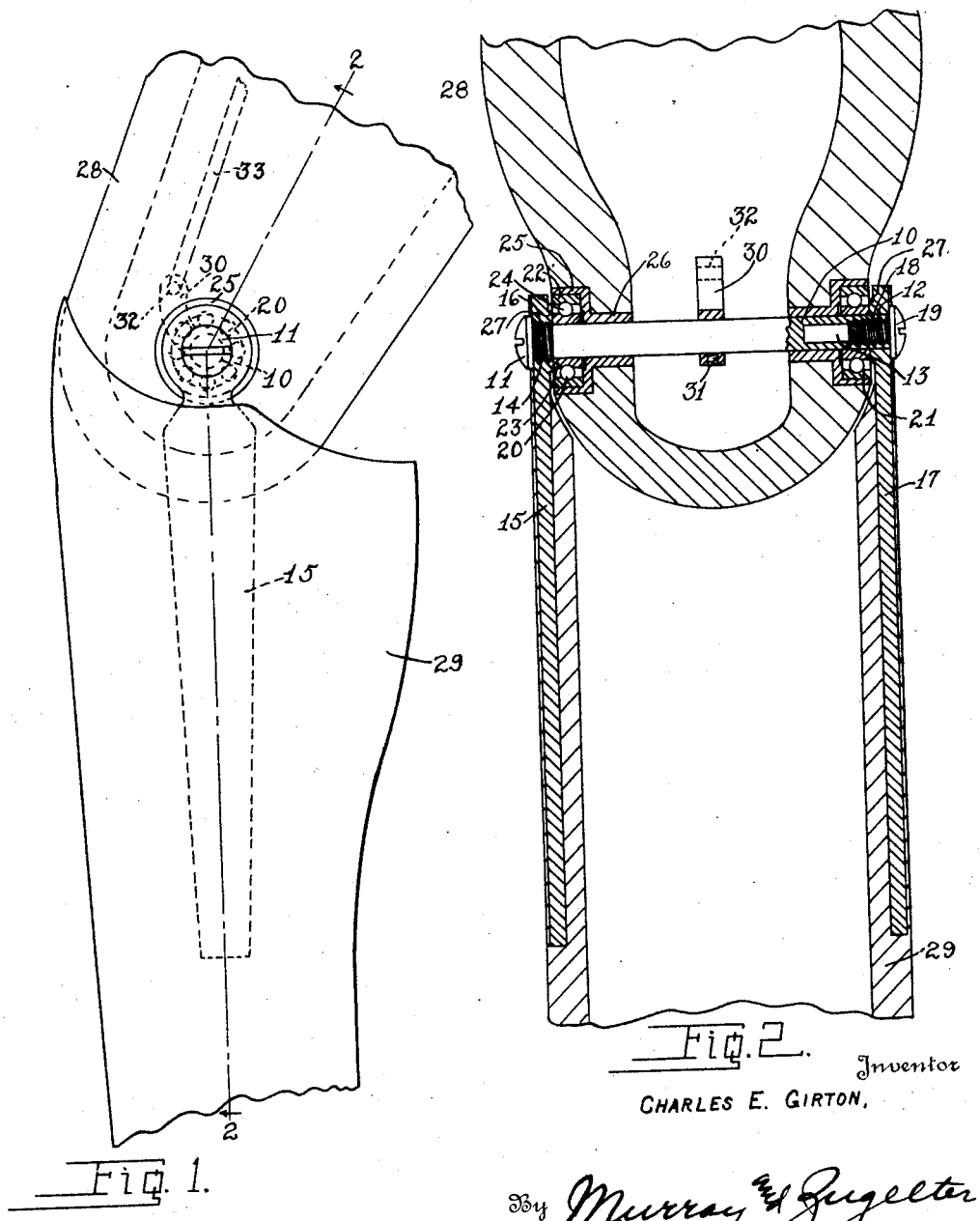
CHARLES E. GIRTON, Inventor Patented Nov. 6, 1928.

1,690,194

UNITED STATES PATENT OFFICE.

CHARLES E. GIRTON, OF CINCINNATI, OHIO.

KNEE JOINT FOR ARTIFICIAL LIMBS.

Application filed January 30, 1926. Serial No. 85,048.

This invention relates to improvements in ball bearing knee joints for artificial limbs.

An object of my invention is to provide a device that can be assembled with its cooperating parts with a minimum of effort and skill.

Another object of my invention is to provide a ball bearing knee joint that may be employed with or without a knee control.

Another object of my invention is to provide an efficient and simple device for the purposes stated.

These and other objects are attained by the means described herein and disclosed in the accompanying drawings, in which:

Fig. 1 is a side view of an artificial limb embodying a device of my invention.

Fig. 2 is a sectional view taken on line 2—2 of Fig. 1.

The device of my invention comprises a shaft 10 having a head 11 formed on one end and internal threads 12 formed within the bore 13 in the shaft 10. The shaft 10 is provided with an enlarged portion adjacent the head 11 on which are formed threads 14. A metal connecting strap 15 having a threaded bore 16 is secured on the enlarged portion of the shaft and extends downwardly therefrom. A second strap 17 having a perforation 18 is carried by and extends downwardly from the opposite end of the shaft 10. A cap screw 19 is received within the threaded portion 12 of the shaft and retains the strap 17 in position on the said shaft. A pair of ball bearings 20 and 21 are mounted upon the shaft 10 at the opposite ends thereof and adjacent the straps 15 and 17. Each of the bearings comprises an outer ball race 22 and an inner ball race 23 having bearing balls 24 intermediate them. A cup like bushing 25 receives the bearings and retains them in position. The bushings 25 are provided with a sleeve 26 extending inwardly from the bushings. The sleeves 26 are provided with bores through which the shaft 10 extends, the bores being slightly larger than the shaft 10.

Each of the straps 15 and 17 are provided with a boss 27 extending inwardly of the straps and contacting the inner race 23 of the ball bearing.

The straps 15 and 17 are secured to the artificial tibia or lower leg portion 29 in the usual manner. The cup shaped bushings 25 are secured to the artificial femur or thigh portion 28 and move therewith. The ball bearings are then placed in the bushings and the shaft extended therethrough. Cap screw 19 is then screwed home thereby clamping the inner bearing races between the straps 15 and 17 so that movement of the artificial tibia moves the shaft and inner races on the bearing balls. It is readily evident the ease with which this device may be assembled. Frequently it is desired to use a knee control with artificial limbs of this type.

By knee control I mean a device whereby the artificial tibia or lower leg portion may be moved about its pivotal mounting without moving the artificial femur. This is accomplished by securing a lever 30 to the shaft 10 in any suitable manner such as by a set screw 31. The lever 30 is provided with a bore 32 or the like through which a cord or rope 33 extends. This cord or rope extends upward about the shoulder of the wearer and by movement of the shoulder, the lever is actuated thereby actuating the shaft 10 and artificial tibia as well. It is readily evident that my device is adaptable to either an artificial limb having a knee control or one without this knee control.

What I claim is:

In a device of the class described the combination of an artificial femur having a pair of bores therein, the ends of the bores being enlarged to provide recesses in the sides of the femur, a pair of perforated cup-shaped bushings having sleeves thereon received in the recesses in the sides of the femur, the sleeves on the bushings extending through the bores, a perforated ball bearing comprising an inner and outer race received in each of the bushings, a revoluble shaft having an enlarged threaded portion at one end extending through the aligned perforations in the ball bearings, a strap threadedly received by the enlarged threaded end of the shaft, a second strap mounted on the other end of the shaft and means for securing the second strap to the shaft and for clamping the inner bearing race to the shaft.

In testimony whereof, I have hereunto subscribed my name this 27th day of January, 1926.

CHARLES E. GIRTON.